(12) United States Patent
Locker et al.

(10) Patent No.: US 11,288,030 B2
(45) Date of Patent: Mar. 29, 2022

(54) USING INFORMATION HANDLING DEVICE FOOTPRINT FOR TRANSFER

(71) Applicant: Lenovo (Singapore) Pte. Ltd., Singapore (SG)

(72) Inventors: Howard Locker, Cary, NC (US); Matthew Lloyd Hagenbuch, Durham, NC (US); John Weldon Nicholson, Cary, NC (US); Steven Richard Perrin, Raleigh, NC (US); Scott Edwards Kelso, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 364 days.

(21) Appl. No.: 13/963,729

(22) Filed: Aug. 9, 2013

(65) Prior Publication Data
US 2015/0042538 A1     Feb. 12, 2015

(51) Int. Cl.
| | |
|---|---|
| *G06F 3/14* | (2006.01) |
| *G06F 3/0346* | (2013.01) |
| *G06F 3/0484* | (2013.01) |
| *G06F 3/0488* | (2013.01) |
| *G06F 3/04842* | (2022.01) |
| *G09G 5/14* | (2006.01) |

(52) U.S. Cl.
CPC .......... *G06F 3/1454* (2013.01); *G06F 3/0346* (2013.01); *G06F 3/0488* (2013.01); *G06F 3/04842* (2013.01); *G06F 2203/04806* (2013.01); *G09G 5/14* (2013.01); *G09G 2340/04* (2013.01); *G09G 2340/045* (2013.01); *G09G 2340/12* (2013.01); *G09G 2354/00* (2013.01)

(58) Field of Classification Search
CPC .. G06F 3/1454; G06F 3/0346; G06F 3/04842; G06F 3/0488; G06F 2203/04806; G09G 5/14; G09G 2340/04; G09G 2340/045; G09G 2340/12; G09G 2354/00
See application file for complete search history.

(56) References Cited

U.S. PATENT DOCUMENTS

| | | | |
|---|---|---|---|
| 8,154,472 B2* | 4/2012 | Yamaguchi | G06F 3/1446 345/1.1 |
| 2007/0273609 A1* | 11/2007 | Yamaguchi | G06F 3/1423 345/1.1 |
| 2008/0150921 A1* | 6/2008 | Robertson | G06F 3/0346 345/204 |
| 2011/0037712 A1* | 2/2011 | Kim | H04M 1/72457 345/173 |
| 2012/0040720 A1* | 2/2012 | Zhang | G06F 3/1454 455/557 |
| 2012/0208466 A1* | 8/2012 | Park | G06F 1/1601 455/41.3 |

(Continued)

*Primary Examiner* — Patrick N Edouard
*Assistant Examiner* — Douglas M Wilson
(74) *Attorney, Agent, or Firm* — Ference & Associates LLC

(57) ABSTRACT

An embodiment provides a method, including: displaying content on a display screen of a first device; determining a position of a second device relative to the display screen of the first device; selecting a portion of the display screen of the first device based on a determined position of the second device; and transferring the portion of the display screen selected to one or more devices. Other aspects are described and claimed.

18 Claims, 7 Drawing Sheets

(56) References Cited

U.S. PATENT DOCUMENTS

2013/0027404 A1\* 1/2013 Sarnoff .................. G09G 5/14
                                                                 345/441
2013/0127734 A1\* 5/2013 Dowd .................. G06F 3/0482
                                                                 345/173

\* cited by examiner

USING INFORMATION HANDLING DEVICE FOOTPRINT FOR TRANSFER

BACKGROUND

Information handling devices ("devices"), for example cell phones, smart phones, tablet devices, laptop and desktop computers, televisions, navigation systems, e-readers, etc., are used for media consumption and many other tasks. In their use, it is common for a user to want to transfer an object (e.g., file, document, image, etc.) from one device to another device. In this regard, it is often the case that the user making the transfer will desire that a portion of the object be transferred rather than the entire object, e.g., copying and pasting a portion of an image file, a portion of a word processing document, etc.

Conventional techniques for performing such transfer actions include the user implementing a selection action (e.g., highlighting the portion of the object, e.g., with a mouse drawing a box around a portion of the object) to select the object portion, saving (e.g., cutting, copying) the object portion to a temporary storage location (e.g., clipboard), and thereafter sending the object portion to the sink or destination (e.g., via email, etc.). The portion of the object selected may be stored on the sink or destination device (e.g., a user device such as a laptop, tablet, or a memory device, e.g., USB key, etc.). Thus, a user that wants to copy or cut a portion of an object and complete a transfer action (e.g., paste the portion of the object into another device's application) must engage in a multi-step process to perform the transfer action successfully.

BRIEF SUMMARY

In summary, one aspect provides a method, comprising: displaying content on a display screen of a first device; determining a position of a second device relative to the display screen of the first device; selecting a portion of the display screen of the first device based on a determined position of the second device; and transferring the portion of the display screen selected to one or more devices.

Another aspect provides an information handling device, comprising: a display screen; one or more processors; a memory storing instructions accessible to the one or more processors, the instructions being executable by the one or more processors to: display content on the display screen of the information handling device; determine a position of a second device relative to the display screen of the information handling device; select a portion of the display screen of the information handling device based on a determined position of the second device; and transfer the portion of the display screen selected to one or more devices.

A further aspect provides a program product, comprising: a storage medium having computer readable program code stored therewith, the computer readable program code comprising: computer readable program code configured to display content on a display screen of a first device; computer readable program code configured to determine a position of a second device relative to the display screen of the first device; computer readable program code configured to select a portion of the display screen of the first device based on a determined position of the second device; and computer readable program code configured to transfer the portion of the display screen selected to one or more devices.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
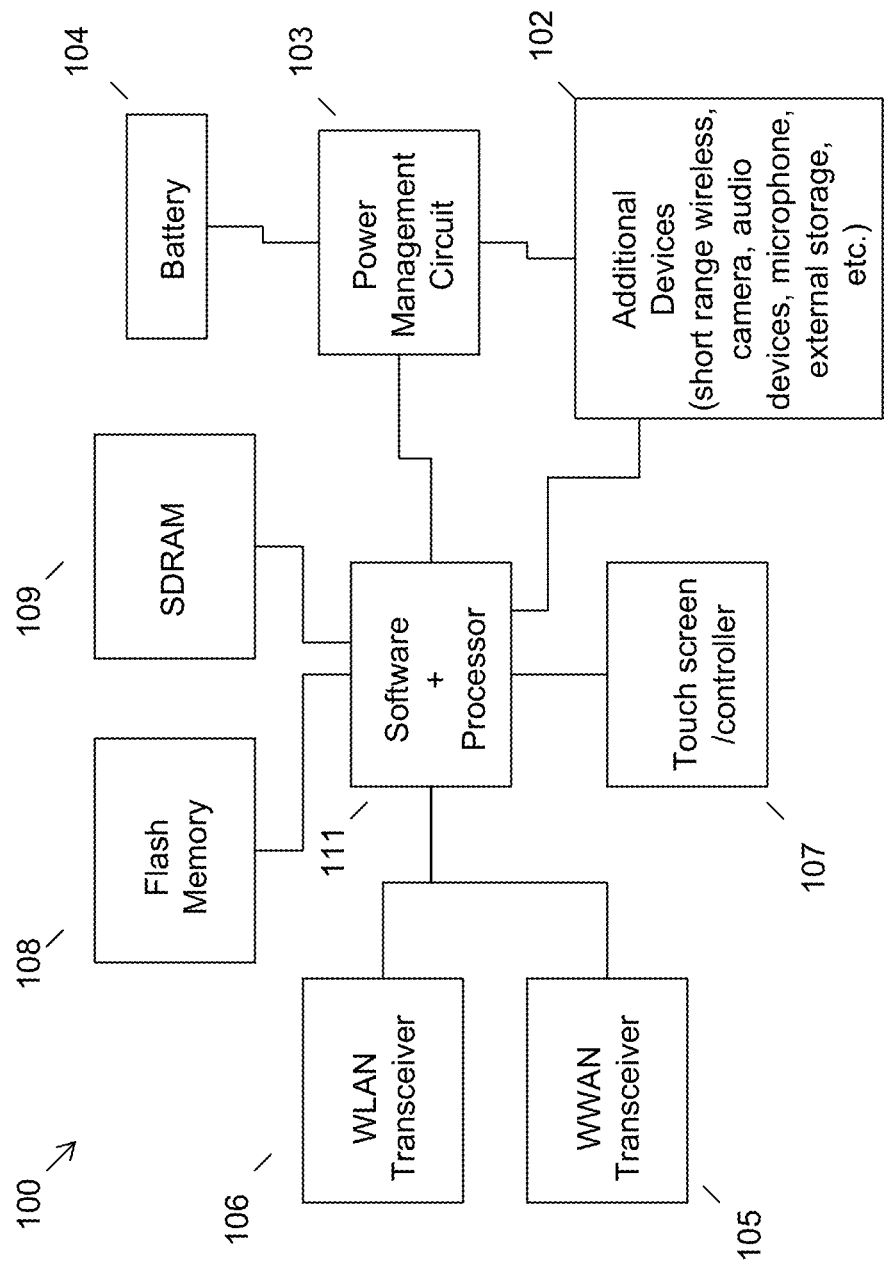
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Existing solutions for transfer actions require many steps and it is often difficult for users to select exactly what to cut/copy, how to send it, where to paste it, etc. Accordingly, an embodiment uses a device footprint for transfers. For example, an embodiment uses a smaller device as the copy/paste clipboard. A user may place the smaller device over a larger device (i.e., the source or device having the object to be selected) on which the object is displayed. The larger device may include a technology (e.g., touch based, optical, or the like) such that the larger device can determine where, in the context of the object as displayed on the larger device, the smaller device is overlaying the display of the object on the larger device (i.e., the "footprint" of the smaller device). Thus, an embodiment permits a user to position the smaller device over the larger device to select a portion of an object to be transferred, thus providing an intuitive selection mechanism.

Using a communication technology (e.g., a personal area network (PAN) technology, a cloud linkage, etc.), the larger device may transfer the portion selected on the screen (pixels) to the smaller device, which then may offer a display of the object portion selected, giving the user feedback on exactly what has been selected for transfer in real time. This simple action gives the user a one-for-one size selection preview. Once the user is satisfied with the selection, a selection action may be executed to fix the portion selected and to transfer the portion of the object to other device(s), including the smaller device used to select the portion of the object. As will become apparent throughout, the portion of the object selected, saved and/or transferred may be scaled or adjusted according to various embodiments.

The illustrated example embodiments will be best understood by reference to the figures. The following description is intended only by way of example, and simply illustrates certain example embodiments.

Figure 2:
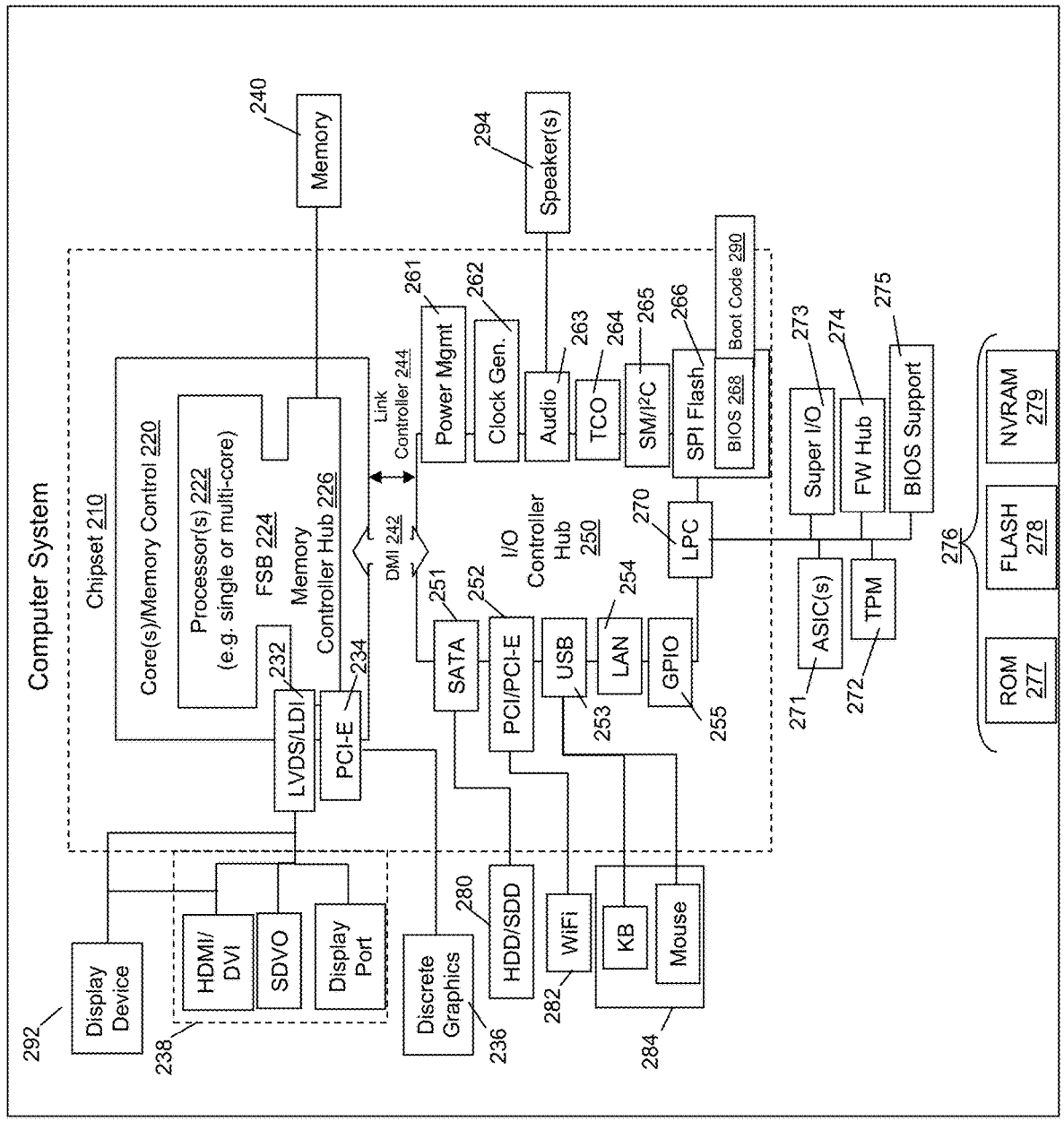
FIG. 2 illustrates another example of information handling device circuitry.

Referring to FIG. 1 and FIG. 2, while various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor (s) are combined in a single chip 111. Internal busses and the like depend on different vendors, but essentially all the peripheral devices (102) may attach to a single chip 111. In contrast to the circuitry illustrated in FIG. 2, the circuitry 100 combines the processor, memory control, and I/O controller hub all into a single chip 111. Also, systems 100 of this type do not typically use SATA or PCI or LPC. Common interfaces for example include SDIO and I2C.

There are power management chip(s) 103, e.g., a battery management unit, BMU, which manage power as supplied for example via a rechargeable battery 104, which may be recharged by a connection to a power source (not shown). In at least one design, a single chip, such as 111, is used to supply BIOS like functionality and DRAM memory.

System 100 typically includes one or more of a WWAN transceiver 105 and a WLAN transceiver 106 for connecting to various networks, such as telecommunications networks and wireless base stations. Commonly, system 100 will include a touch screen 107 for data input and display. System 100 also typically includes various memory devices, for example flash memory 108 and SDRAM 109.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling devices, as for example outlined in FIG. 1 and FIG. 2, may provide transfer functionality as described herein. In the examples that follow, the devices described include a larger device, e.g., a tablet device and a smaller device, e.g., a smart phone. These are non-limiting examples, however, and other devices may be used to implement the actions described in connection with the example embodiments. It should also be noted that throughout a portion of an object is used as an example of a transfer action. However, an entire object or set of objects may be transferred and the use of a portion of an object is simply for ease of describing a transfer of screen contents or display data between devices.

Figure 3:
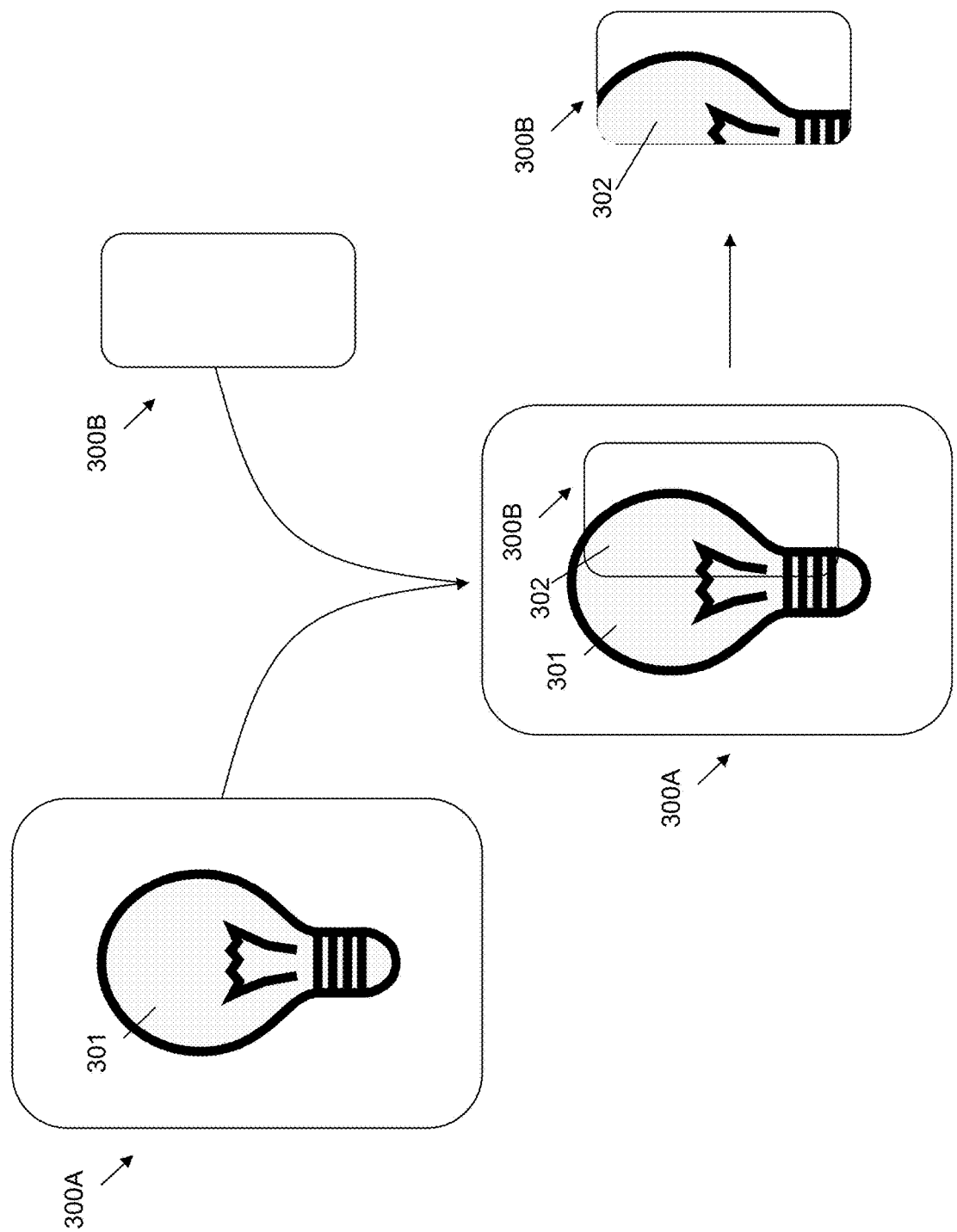
FIG. 3 illustrates an example of using an information handling device footprint for a transfer.

In FIG. 3 an overall outline of a transfer application according to embodiments is illustrated. In this example, a larger device 300A, e.g., a tablet computing device ("tablet") displays an object 301, a portion of which the user is to copy to another device, e.g., small device 300B (e.g., a smart phone). The object 301 is rendered on a display screen of the larger device 300A.

The user physically positions the smaller device 300B over the portion of the object 301 which is to be selected, as displayed on the larger device 300A. In the example illustrated, the portion of the object selected 302 underlies the smaller device 300B when the smaller device 300B is placed over the larger device 300A.

The larger device 300A determines the positioning or footprint of the smaller device 300B relative to the object 301 on the display of the larger device 300A. Many mechanisms may be used to make this determination. For example, the larger device 300A may include a touch-based technology, e.g., implemented as a layer in a touch screen of the larger device 300A, such that the physical presence of the smaller device 300B may be ascertained. As another example, if the larger device 300B has optical sensor(s), e.g., camera(s), the smaller device's 300B location and thus footprint may be detected and inferred or extrapolated/scaled to the larger device 300A. Pinch and/or zoom gestures may be made directly on device 300B to enlarge and/or reduce the percentage of the screen of device 300A that device 300B captures.

Other position and/or orientation mechanisms may be used. For example, a distance between the smaller device 300B and the larger device 300A may be utilized to enlarge or reduce the footprint of the smaller device 300B and in turn reduce the amount of the object 301 highlighted as the selected portion 302. As another example, a tilt of the smaller device 300B relative to the larger device 300A may be used to modify the selected portion of the object 302, e.g., such as for example modifying the selected portion to match the tilt of the smaller device 300B. Other combinations are possible given information regarding the location and/or orientation of the smaller device 300B relative to the larger device 300A.

A selection indicator may be provided to the user such that the user is apprised of the portion 302 that is determined as being include in the smaller device's 300B footprint. A selection indicator may be provided on the smaller device 300B, for example as a preview of the contents of portion 302 rendered on a display of the smaller device 300B. In one example, a user places device 300B onto device 300A to get a one-to-one copy of the object portion 302 defined by device 300B's footprint. Then, a user may use pinch/zoom gestures directly on device 300B, e.g., on a touch screen of device 300B, to provide sizing information to enlarge and/or reduce the percentage of the screen of device 300A that device 300B captures, i.e., to scale the object portion 302 copied to device 300B. The selection indicator may take a variety of forms. A selection indicator also may be provided on the display of the larger device 300A. Thus, the user may have real time feedback regarding the footprint or selected portion 302.

Once the user is satisfied that the portion 302 is the portion of the object the user wants to transfer (e.g., copy, cut), the selection may be fixed or confirmed (e.g., through a variety of mechanisms, as described herein), and the portion of the object 302 may be transferred to another device or devices. An embodiment may implement the transfer action automatically, e.g., after a predetermined period of stable selection of portion 302, or may implement the transfer responsive to an explicit instruction from the user (e.g., as provided by user input to smaller device 300B, the larger device 300A, or another device or devices). For example, the user may pick the smaller device 300B up to fix the selection and initiate the transfer action, e.g., a copy or cut action.

In an embodiment, the transfer may be made directly, i.e., to the smaller device. This may be accomplished for example using a PAN connection between devices 300A and 300B. Moreover, an embodiment may transfer the object to other or additional devices, such as transferring the portion of the object selected 302 to a cloud based storage device. This may facilitate transfer to multiple devices and/or transfers that are completed at a later time (e.g., after a user accesses cloud storage device to retrieve a copied portion of an object). An embodiment may transfer the portion of the object to the smaller device 300B via another device (e.g., cloud device) in near real time as well, or the transfer may be completed at a later time.

Figure 4:
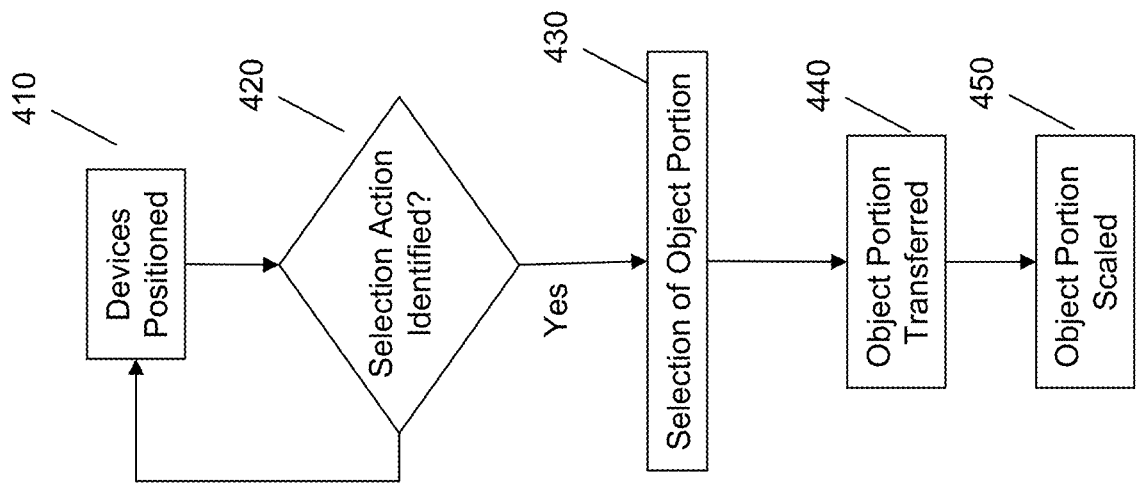
FIG. 4 illustrates an example method of using an information handling device footprint for a copy action.

Accordingly, referring to FIG. 4, a user simply positions devices (e.g., device 300A and 300B) relative to one another at 410. The user may reposition the device(s), including tilting and/or moving the devices closer to or farther away from one another, to manipulate the footprint of the smaller device on the larger device's display, or the user may utilize pinch/zoom gestures on the smaller device, as described herein, and thus manipulate the portion of the object selected. Responsive to this positioning (and re-positioning of devices, if necessary) a selection action is identified at 420. Again, the selection action may be explicit (e.g., a user clicking a confirmation that the preview looks correct, the user picking up the device, etc.) or implicit (e.g., the user lays the smaller device on the larger device and leaves it without repositioning for a predetermined time). If the selection action is identified, the portion of the object is selected at 430 and the object portion is transferred at 440.

Again, transferred portion may be transmitted in a variety of ways to a variety of devices. As part of this transfer, the portion of the object may be scaled at 450 (noting that the scaling, as with other steps, may occur at a different time than indicated in the example of FIG. 4). Scaling may be implemented, e.g., to appropriately fit the display of the smaller device. This can be done in a variety of ways. In one example, a scaling of the selected portion (i.e., literal pixels of the larger device's object display included in the selection portion) may be accomplished by a user moving the smaller device over (e.g., up and away from) the larger device. As the movement happens the same transfer occurs but with a scaling so the total area swiped is perfectly scaled into the smaller device's screen. Once the user is satisfied the user can pick up the device thereby ending the copy and/or cut operation, i.e., by confirming the selection action allowing its identification at 420.

Figure 5:
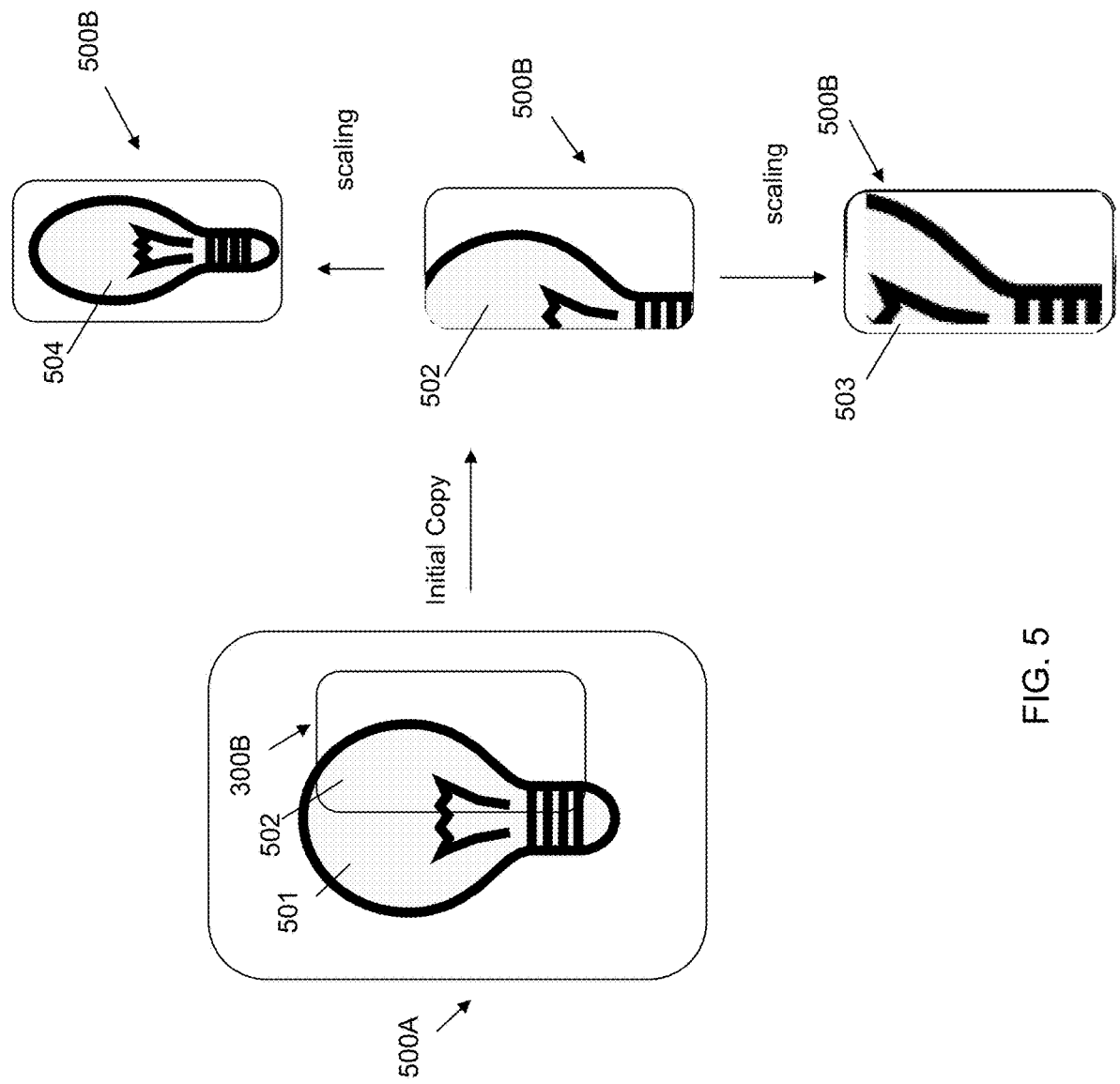
FIG. 5 illustrates an example of scaling for a transfer.

As described herein, scaling of the object portion selected (e.g., for copying to a smaller device) may be implemented with pinch/zoom gestures, as illustrated in FIG. 5. In one example, a user places a smaller device 500B over a larger device 500A and positions it appropriately to initially select a portion 502 of an object 501 displayed by the larger device 500A. A preview of the initial copy of the object portion 502 is transferred to the smaller device 500B. A user may then manipulate the portion of the object 502 initially copied to enlarge the portion of the object 504 (e.g., via zooming) or reduce the portion of the object 503 on the screen of device 500A that is to be copied. For example, a user may provide sizing information such as pinch or zoom gestures to, e.g., a touch screen of the smaller device 500B such that the object portion 502 is re-sized. The user may do this while device 500B is positioned over device 500A or, as illustrated, after moving the device 500B relative to device 500A.

Figure 6:
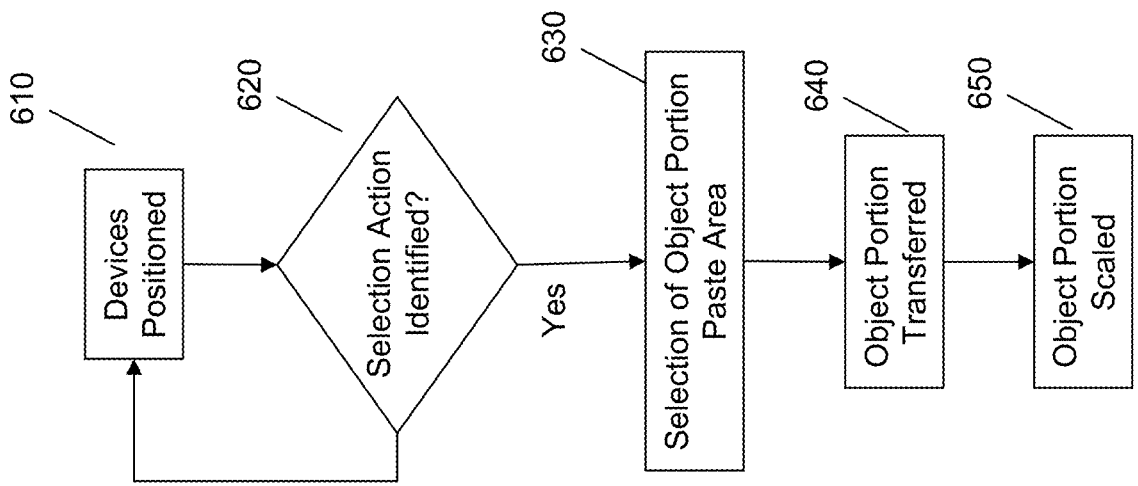
FIG. 6 illustrates an example method of using an information handling device footprint for a paste action.

A paste action is similar to a copy (or cut) action, as outlined in FIG. 6. For example, the user may position a smaller device which contains the copy from a transfer as outlined in FIG. 3 and FIG. 4 onto a larger device at the exact location of where the paste should take place at 610.

Responsive to a selection action being identified at 620, in this context that the object portion to be pasted is properly positioned within the larger device's display (which again may include scaling or scaling may be implemented at a later step), a selection of this area is made at 630. In this regard, selection is confirmed as to the positioning of the object portion to be pasted or dropped into the larger device's display. The object portion information (e.g., pixel information) is transferred (e.g., via a PAN or cloud communication mechanism) from the smaller device to the larger device at 640.

It may occur often that on the paste action, scaling is not desirable. However, once the object is pasted into the larger screen the user can use a mechanism (e.g., pinch and zoom or manipulation of the smaller and larger device relative positions/orientations) to adjust or scale the paste object portion size to the desired size at 650. Again, the various steps may occur in different orders, and the user may scale the object portion to be pasted prior to a selection action being identified at 620 and confirmed at 630. If a user wanted to scale the object pasted, e.g., using the smaller device, the user may do so, e.g., by moving the smaller device over a larger area of the larger device's screen. This would scale up the object. Once the user is satisfied, a past action may be completed, e.g., by a user picking up the smaller device or moving the smaller device away (relative to the larger device).

Figure 7:
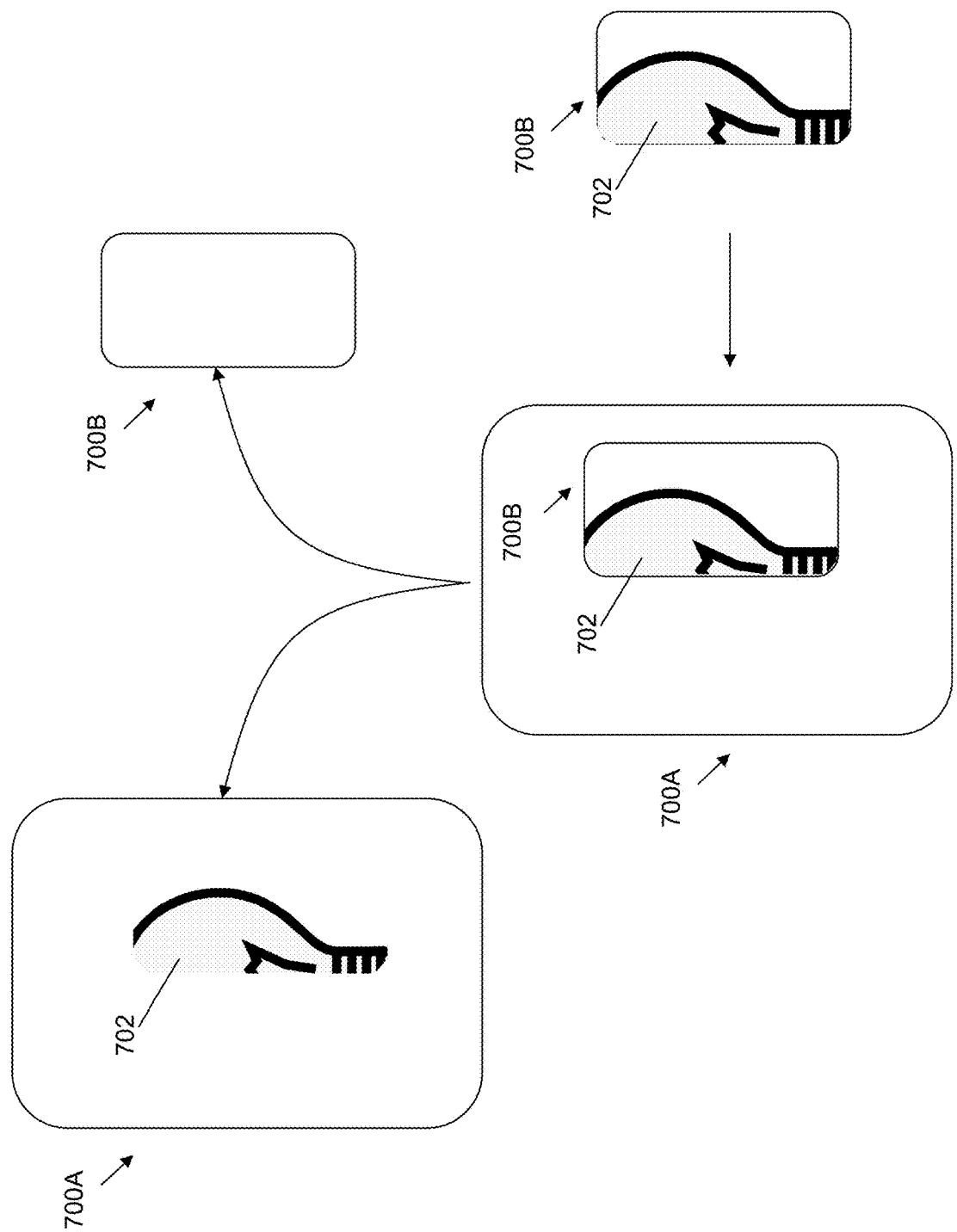
FIG. 7 illustrates an example of using an information handling device footprint for a paste action.

An example of a paste action is outlined in FIG. 7. Here, a smaller device 700B contains a portion of an object 702 which is to be pasted to a larger device 700A. Thus, a user positions the smaller device 700B over the larger device such that the portion of the object 702 is appropriately positioned within the display screen of the larger device 700A. Once the user is satisfied with the paste action (positioning, scaling, etc.), the selection action (paste action) is confirmed and the portion of the object 702 is transferred to the larger device 700A. This transfer action may occur for example when the user removes the smaller device 700B from the larger device 700A and/or it could be confirmed with a gesture (e.g., on the larger device).

Accordingly, embodiments may be used to complete transfer actions by simple physical manipulation of two devices. This provides a user with an intuitive way to appropriately select object(s) and portions thereof for transfer, e.g., between the devices in question and/or to other devices, such as those linked via a PAN or cloud account services. In terms of completing the transfers, embodiments may provide that the object is transferred using a dedicated transfer application that operates according to the various examples used herein. Additionally or alternatively, an embodiment may utilize existing applications (e.g., the ones containing the object to be transferred and the application to which the object is transferred) to complete the transfers.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

displaying graphical content on a display screen of a first device, the graphical content comprising at least one object;

determining a position of a second device relative to the display screen of the first device, wherein the determining a position comprises using at least one of: touch-based technology and an image capture device, and wherein the determining a position comprises determining an orientation and a location of the second device relative to an object of the graphical content displayed on the display screen of the first device;

selecting a portion of the object displayed on the display screen of the first device, wherein the selecting a portion comprises identifying the portion of the object displayed on the display screen of the first device that corresponds to and is within an outline, identified based upon the determined position, of the second device with respect to the display screen of the first device and copying an image of the portion of the object that corresponds to and is within the outline, wherein the selecting a portion comprises providing a selection indicator, on the display screen of the first device, identifying the portion of the object to be selected; and transferring, responsive to receiving a transfer indication, the image of the portion of the object within the selected portion to one or more devices, wherein the transferring comprises storing the selected portion of the graphical content on the one or more devices.

2. The method of claim 1, wherein the outline of the second device is defined by the outer peripheral edge of the second device.

3. The method of claim 1, wherein the selecting comprises providing a preview of the portion of the display screen of the first device on a display screen of the second device.

4. The method of claim 1, further comprising applying scaling to the portion of the display screen of the first device.

5. The method of claim 1, further comprising adjusting the content of the portion of the display screen of the first device for display on the second device.

6. The method of claim 4, wherein applying scaling comprises scaling the portion of the display screen of the first device selected based on sizing information received at the first device.

7. The method of claim 4, wherein applying scaling comprises scaling the portion of the display screen of the first device selected based on gesture information received at the first device, wherein the gesture information is derived from the second device and is selected from the group consisting of a pinch gesture and a zoom gesture.

8. The method of claim 1, wherein the one or more devices comprises the second device.

9. The method of claim 1, wherein the one or more devices comprises a device associated with the first device by an association selected from the group consisting of a personal area network association and a cloud account association.

10. An information handling device, comprising:
a display screen;
one or more processors;
a memory storing instructions accessible to the one or more processors, the instructions being executable by the one or more processors to:
display graphical content on the display screen of the information handling device, the graphical content comprising at least one object;
determine a position of a second device relative to the display screen of the information handling device, wherein
to determine comprises using at least one of: touch-based technology and an image capture device, and wherein
to determine comprises to determine an orientation and a location of the second device relative to an object of the graphical content displayed on the display screen of the information handling device;
select a portion of the object displayed on the display screen of the information handling device,
wherein to select a portion comprises identifying the portion of the object displayed on the display screen of the information handling device that corresponds to and is within an outline, identified based upon the determined position, of the second device with respect to the display screen of the information handling device and copying an image of the portion of the object that corresponds to and is within the outline, wherein
the selecting comprises providing a selection indicator, on the display screen of the information handling device, identifying the portion of the object to be selected;
transfer, responsive to receiving a transfer indication, the image of the portion of the object within the selected portion to one or more devices, wherein
the transferring comprises storing the selected portion of the graphical content on the one or more devices.

11. The information handling device of claim 10, wherein the outline of the second device is defined by the outer peripheral edge of the second device.

12. The information handling device of claim 10, wherein to select comprises providing a preview of the portion of the display screen of the information handling device on a display screen of the second device.

13. The information handling device of claim 10, wherein the instructions are further executable by the one or more processors to apply scaling to the portion of the display screen of the information handling device.

14. The information handling device of claim 10, wherein the instructions are further executable by the one or more processors to adjust the content of the portion of the display screen of the information handling device for display on the second device.

15. The information handling device of claim 13, wherein to apply scaling comprises scaling the portion of the display screen of the information handling device selected based on sizing information received at the information handling device.

16. The information handling device of claim 13, wherein to apply scaling comprises scaling the portion of the display screen of the information handling device selected based on gesture information received at the information handling device, wherein the gesture information is derived from the second device and is selected from the group consisting of a pinch gesture and a zoom gesture.

17. The information handling device of claim 10, wherein the one or more devices comprises a device associated with the information handling device by an association selected from the group consisting of a personal area network association and a cloud account association.

18. A program product, comprising:
a storage medium having computer readable program code stored therewith, the computer readable program code comprising:
computer readable program code that displays graphical content on a display screen of a first device, the graphical content comprising at least one object;
computer readable program code that determines a position of a second device relative to the display screen of the first device, wherein
the computer readable program code that determines comprises using at least one of: touch-based technology and an image capture device, and wherein
the computer readable program code that determines comprises computer readable program code that determines an orientation and a location of the second device relative to an object of the graphical content displayed on the display screen of the first device;
computer readable program code that selects a portion of the object displayed on the display screen of the first device, wherein the selecting a portion comprises identifying the portion of the object displayed on the display screen of the first device that corresponds to and is within an outline, identified based upon the determined position, of the second device with respect to the display screen of the first device and copying an image of the portion of the object that corresponds to and is within the outline, wherein the selecting a portion comprises providing a selection indicator, on the display screen of the first device, identifying the portion of the object to be selected; and computer readable program code that transfers, responsive to receiving a transfer indication, the image of the portion of the object within the selected portion to one or more devices, wherein the transferring comprises storing the selected portion of the graphical content on the one or more devices.

\* \* \* \* \*